United States Patent
Yoshida

(10) Patent No.: US 12,291,047 B2
(45) Date of Patent: May 6, 2025

(54) INSPECTION APPARATUS AND PRINTING APPARATUS

(71) Applicant: BROTHER KOGYO KABUSHIKI KAISHA, Nagoya (JP)

(72) Inventor: Akidi Yoshida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 102 days.

(21) Appl. No.: 18/168,779

(22) Filed: Feb. 14, 2023

(65) Prior Publication Data
US 2023/0256760 A1 Aug. 17, 2023

(30) Foreign Application Priority Data

Feb. 16, 2022 (JP) ................................. 2022-021987

(51) Int. Cl.
| | |
|---|---|
| B41J 3/407 | (2006.01) |
| B41J 29/393 | (2006.01) |
| G06K 1/12 | (2006.01) |
| G06K 7/14 | (2006.01) |

(52) U.S. Cl.
CPC .......... *B41J 29/393* (2013.01); *B41J 3/4075* (2013.01); *G06K 1/121* (2013.01); *G06K 7/1413* (2013.01)

(58) Field of Classification Search
CPC ...... B41J 3/4075; B41J 11/0095; B41J 15/05; B41J 29/393; G06K 1/121; G06K 7/1413
See application file for complete search history.

(56) References Cited

U.S. PATENT DOCUMENTS

| | | | |
|---|---|---|---|
| 10,810,389 B2 | 10/2020 | Wheatley | |
| 2002/0108052 A1* | 8/2002 | Maruyama | ........... B41J 2/04536 |
| | | | 713/193 |
| 2009/0092279 A1* | 4/2009 | Tabata | ................. G06V 10/993 |
| | | | 382/100 |
| 2011/0299107 A1* | 12/2011 | Tanji | ..................... G06F 3/1263 |
| | | | 358/1.13 |

FOREIGN PATENT DOCUMENTS

| | | |
|---|---|---|
| JP | 2005-212373 A | 8/2005 |
| JP | 2015-212873 A | 11/2015 |

* cited by examiner

*Primary Examiner* — Anh T Vo
(74) *Attorney, Agent, or Firm* — KENEALY VAIDYA LLP

(57) ABSTRACT

An inspection apparatus includes a conveyer configured to convey a medium having a plurality of printing areas in a conveying direction, a reader configured to read images printed in the printing areas, and a controller. When a plurality of images, each of which a printing position of a code in the printing area is the same as the other images, are respectively printed in the printing areas, the controller causes the reader to read a prescribed image, inspects whether the code satisfies a prescribed condition, acquires position information for specifying a printing position of the code, causes the reader to read an upstream image in a printing area upstream of the prescribed image, extracts a processing range in which the code is included from a read image of the upstream image based on the position information, and inspects whether the code included in the processing range satisfies the prescribed condition.

19 Claims, 9 Drawing Sheets

INSPECTION APPARATUS AND PRINTING APPARATUS

REFERENCE TO RELATED APPLICATIONS

This application claims priority from Japanese Patent Application No. 2022-021987 filed on Feb. 16, 2022. The entire content of the priority application is incorporated herein by reference.

BACKGROUND ART

Aspects of the present disclosure relate to an inspection apparatus configured to inspect quality of a code symbol such as a bar code and a printing apparatus provided with the inspection apparatus.

Conventionally, as one type of printing apparatus, there has been known a printing apparatus which is configured to use a roll sheet formed by winding a long backing sheet (continuous sheet) in a roll shape and sequentially print images on labels (printing areas) arranged on the backing sheet in the longitudinal direction while conveying the backing sheet in the longitudinal direction.

In this type of printing apparatus, there has been known a printing apparatus which is configured to read an image printed on a label with an image reader and inspect quality of a code such as a bar code printed on the label using the read image.

DESCRIPTION

In order to accurately inspect the quality of the code, a high-resolution scanned image is required. However, the high-resolution scanned image takes time to process the image for inspecting the quality of the code.

Therefore, in the above-mentioned technology, a process of the quality inspection of the code delays with respect to a process of label printing. As a result, there arises a problem that the quality inspection is not completed even when the printing is completed.

At least one aspect of the present disclosure is advantageous to provide an inspection apparatus and a printing apparatus capable of reducing time required for a quality inspection on whether a code satisfies a prescribed condition or not.

According to aspects of the present disclosure, there is provided an inspection apparatus including a conveyer configured to convey a medium having a plurality of printing areas in a conveying direction so that the plurality of printing areas are conveyed in turn in the conveying direction, a reader configured to read images printed in the plurality of printing areas on the medium conveyed by the conveyer, and a controller. When a plurality of images, each of which a printing position of a code in the printing area is the same as the other images, are respectively printed in the plurality of printing areas, the controller causes the reader to read a prescribed image printed in a prescribed printing area among the plurality of printing areas, inspects whether the code satisfies a prescribed condition based on a read image of the prescribed image read by the reader, acquires position information for specifying a printing position of the code from the read image of the prescribed image, causes the reader to read an upstream image printed in an upstream printing area upstream of the prescribed image in the conveying direction, extracts a processing range in which the code is included from a read image of the upstream image read by the reader based on the position information, and inspects whether the code included in the processing range satisfies the prescribed condition.

According to aspects of the present disclosure, there is further provided an inspection apparatus including a conveyer configured to convey a medium having a plurality of printing areas in a conveying direction so that the plurality of printing areas are conveyed in turn in the conveying direction, a reader configured to read images printed in the plurality of printing areas on the medium conveyed by the conveyer, and a controller. When the plurality of printing areas are to be printed so that a plurality of image sets, each consisting of two or more images respectively including a code and respectively printed in two or more consecutive printing areas in the conveying direction, are repeatedly arranged in the conveyance direction, the controller causes the reader to read individual images of a prescribed image set among the plurality of image sets, inspects whether the codes included in the individual images satisfy a prescribed condition based on the read individual images of the prescribed image set read by the reader, acquires position information for specifying printing positions of the codes in the respective printing areas based on the read individual images of the prescribed image set read by the reader, causes the reader to read individual images of an upstream image set upstream of the prescribed image set in the conveying direction, extracts a processing range in which the code is included from each of the read individual images of the upstream image set based on the position information, and inspects whether the code included in each of the extracted processing range satisfies a prescribed condition.

According to aspects of the present disclosure, there is further provided a printing apparatus including an inspection apparatus including a conveyer configured to convey a medium having a plurality of printing areas in a conveying direction so that the plurality of printing areas are conveyed in turn in the conveying direction, a reader configured to read images printed in the plurality of printing areas on the medium conveyed by the conveyer, and a controller, a receiver configured to receive data of a plurality of images to be printed in the plurality of printing areas, respectively, and a print engine provided upstream of the reader in the conveying direction and configured to print an image of the data received by the receiver in each of the plurality of printing areas on the medium conveyed by the conveyer. When the plurality of images, each of which a printing position of a code in the printing area is the same as the other images, are respectively printed in the plurality of printing areas, the controller causes the reader to read a prescribed image printed in a prescribed printing area among the plurality of printing areas, inspects whether the code satisfies a prescribed condition based on a read image of the prescribed image read by the reader, acquires position information for specifying a printing position of the code from the read image of the prescribed image, causes the reader to read an upstream image printed in an upstream printing area upstream of the prescribed image in the conveying direction, extracts a processing range in which the code is included from a read image of the upstream image read by the reader based on the position information, and inspects whether the code included in the processing range satisfies the prescribed condition.

According to aspects of the present disclosure, there is further provided a printing apparatus including an inspection apparatus including a conveyer configured to convey a medium having a plurality of printing areas in a conveying direction so that the plurality of printing areas are conveyed in turn in the conveying direction, a reader configured to read images printed in the plurality of printing areas on the medium conveyed by the conveyer, and a controller, a receiver configured to receive data of the two or more images to be printed in the two or more consecutive printing areas, respectively, and a print engine provided upstream of the reader in the conveying direction and configured to print the two or more images of the data received by the receiver in the two or more consecutive printing areas on the medium conveyed by the conveyer, respectively. When the plurality of printing areas are to be printed so that a plurality of image sets, each consisting of two or more images respectively including a code and respectively printed in two or more consecutive printing areas in the conveying direction, are repeatedly arranged in the conveyance direction, the controller causes the reader to read individual images of a prescribed image set among the plurality of image sets, inspects whether the codes included in the individual images satisfy a prescribed condition based on the read individual images of the prescribed image set read by the reader, acquires position information for specifying printing positions of the codes in the respective printing areas based on the read individual images of the prescribed image set read by the reader, causes the reader to read individual images of an upstream image set upstream of the prescribed image set in the conveying direction, extracts a processing range in which the code is included from each of the read individual images of the upstream image set based on the position information, and inspects whether the code included in each of the extracted processing range satisfies a prescribed condition.

Hereinafter, an embodiment according to aspects of the present disclosure will be described in detail with reference to the accompanying drawings.

Overall Configuration of Label Printer

Figure 1:
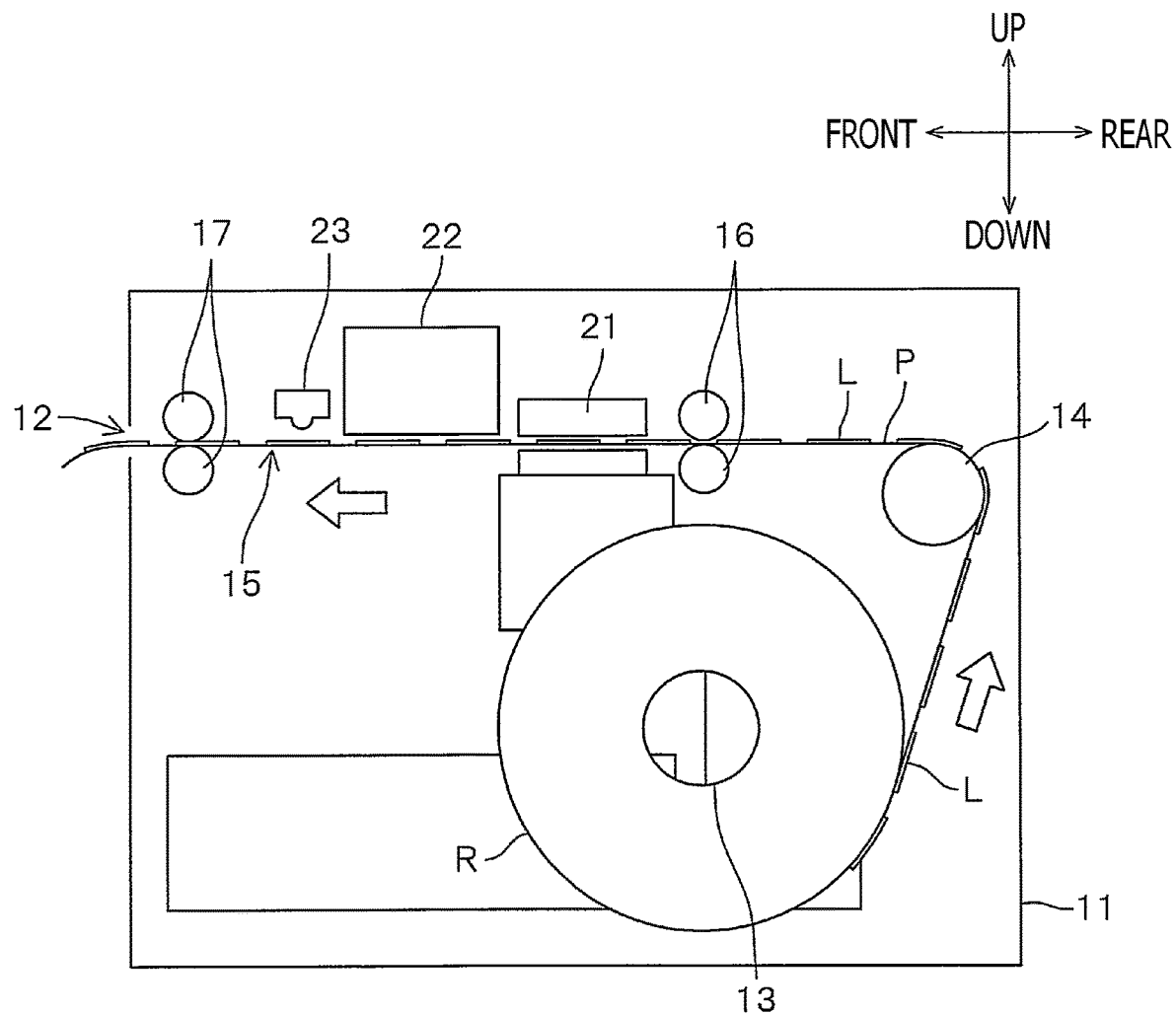
FIG. 1 is a sectional view schematically illustrating a configuration of a label printer.

As shown in FIG. 1, a label printer 1 is an apparatus configured to print images on a long continuous sheet P. The printed continuous sheet P is discharged from a discharge port 12 formed on a side surface of a housing 11 forming an outer shell of the label printer 1.

In the following description, the side surface where the discharge port 12 is formed is referred to as the front side of the label printer 1, a side opposite to the front side is referred to as the rear side of the label printer 1, and the left and right hand sides when the label printer 1 is viewed from the front side are referred to as the left and right sides of the label printer 1, respectively. The upper and lower sides of the label printer 1 are defined based on the label printer 1 installed on a horizontal plane. The sectional view shown in FIG. 1 shows a section of the label printer 1 cut along a plane extending in the front-rear direction as viewed from the right side.

The continuous sheet P may be a die-cut sheet in which labels L are pasted on a long backing sheet while being arranged in a longitudinal direction of the backing sheet, may be an irregular length sheet (continuous sheet) in which base images for setting printing areas at constant intervals are already printed on a printing surface of a long plain paper, or may be an irregular length sheet made of plain paper on which such base images are not printed. In the die-cut sheet, a printing surface opposite to an adhesive surface of each label L is a printing area. Hereinafter, the case where the continuous sheet P is the die-cut sheet will be taken as an example.

The discharge port 12 is a rectangular opening extending in the right-left direction and connects the inside and outside of the housing 11.

A roll holder 13 configured to hold the continuous sheet P in a state of a roll R is provided in the housing 11. The continuous sheet P is wound around a roll core with a printing surface facing outward in the state of the roll R. The roll holder 13 has a substantially cylindrical shape, and the roll R is held by the roll holder 13 by externally fitting the roll core to the roll holder 13.

A direction changing roller 14 is provided in the housing 11 behind and above the roll holder 13. A conveying path 15 through which the continuous sheet P is conveyed is provided on the front side of the direction changing roller 14. The conveying path 15 extends from a position above the direction changing roller 14 toward the front side, and a front end of the conveying path 15 is connected to the discharge port 12. The continuous sheet P is drawn out from the roll R toward the rear side of the direction changing roller 14, a moving direction of the continuous sheet P is changed to the forward direction by making the continuous sheet P to lie along a circumferential surface of the direction changing roller 14, and the continuous sheet P passes through the conveying path 15 toward the discharge port 12.

Conveying rollers 16 configured to convey the continuous sheet P are provided to the conveying path 15. The conveying rollers 16 are disposed at a distance in front of the direction changing roller 14. Conveying rollers 17 are disposed behind the discharge port 12 and at a distance in front of the conveying rollers 16.

In a state in which the continuous sheet P is passing between the conveying rollers 16, the continuous sheet P is conveyed along the conveying path 15 toward the discharge port 12 in a feeding direction which is one of directions in which the labels L are arranged as driving force generated by a forward rotation of the motor M (see FIG. 2) is transmitted to the conveying rollers 16 and the conveying rollers 16 rotate. A transmission path of the driving force of the motor M is also connected to the roll holder 13. The continuous sheet P is conveyed in a pull-back direction opposite to the feeding direction as driving force generated by a reverse rotation of the motor M is transmitted to the roll holder 13, the roll holder 13 rotates in a direction opposite to a direction for conveying the continuous sheet P in the feeding direction, and the roll R rotates integrally with the roll holder 13.

When decelerating or stopping the continuous sheet P conveyed by the conveying rollers 16, the roll holder 13 is driven forward or backward by the driving force of the motor M so as to adjust the inertial force acting on the roll R. The direction changing roller 14 is configured to apply tension to the continuous sheet P between the roll holder 13 and the conveying rollers 16, and a mechanism for detecting a magnitude of the tension of the continuous sheet P is provided in association with the direction changing roller 14.

Between the conveying rollers 16 and 17, a print head 21, a heater 22, and a Contact Image Sensor (CIS) unit 23 are arranged in this order in the feeding direction.

The print head 21 is disposed so as to face the conveying path 15 from above. The print head 21 prints an image on the label L on the continuous sheet P conveyed along the conveying path 15, for example, by an ink jet recording method. A position at a prescribed distance downstream from an upstream end of the print head 21 in the feed direction is a printing position by the print head 21, and the print head 21 prints an image on the label L at the printing position.

The heater 22 is disposed downstream of the print head 21 in the feeding direction so as to face the conveying path 15 from above. The heater 22 fixes ink on the label L by heating the continuous sheet P after the printing by the print head 21.

The CIS unit 23 is disposed downstream of the print head 21 in the feeding direction so as to face the conveying path 15 from above. The CIS unit 23 reads the label L on the continuous sheet P conveyed along the conveying path 15. Specifically, the CIS unit 23 includes a light source 36 (see FIG. 2), a rod lens array, and a linear image sensor. The light source 36 irradiates the label L on the continuous sheet P with line-shaped light, and light reflected on the printing surface enters the linear image sensor through the rod lens array. Thereby, at a reading position of the CIS unit 23, the label L is read by one line in a main scanning direction. The linear image sensor includes a plurality of light receiving elements 37 (see FIG. 2) that are arranged in a line in the main scanning direction, and a piece of image data read by each light receiving element 37 forms one pixel of an image (i.e., one pixel value). The main scanning direction is a direction perpendicular to the feeding direction (pull-back direction) of the continuous sheet P in the conveying path 15 and extending parallel to the conveying path 15.

Main Part of Electrical Configuration

Figure 2:
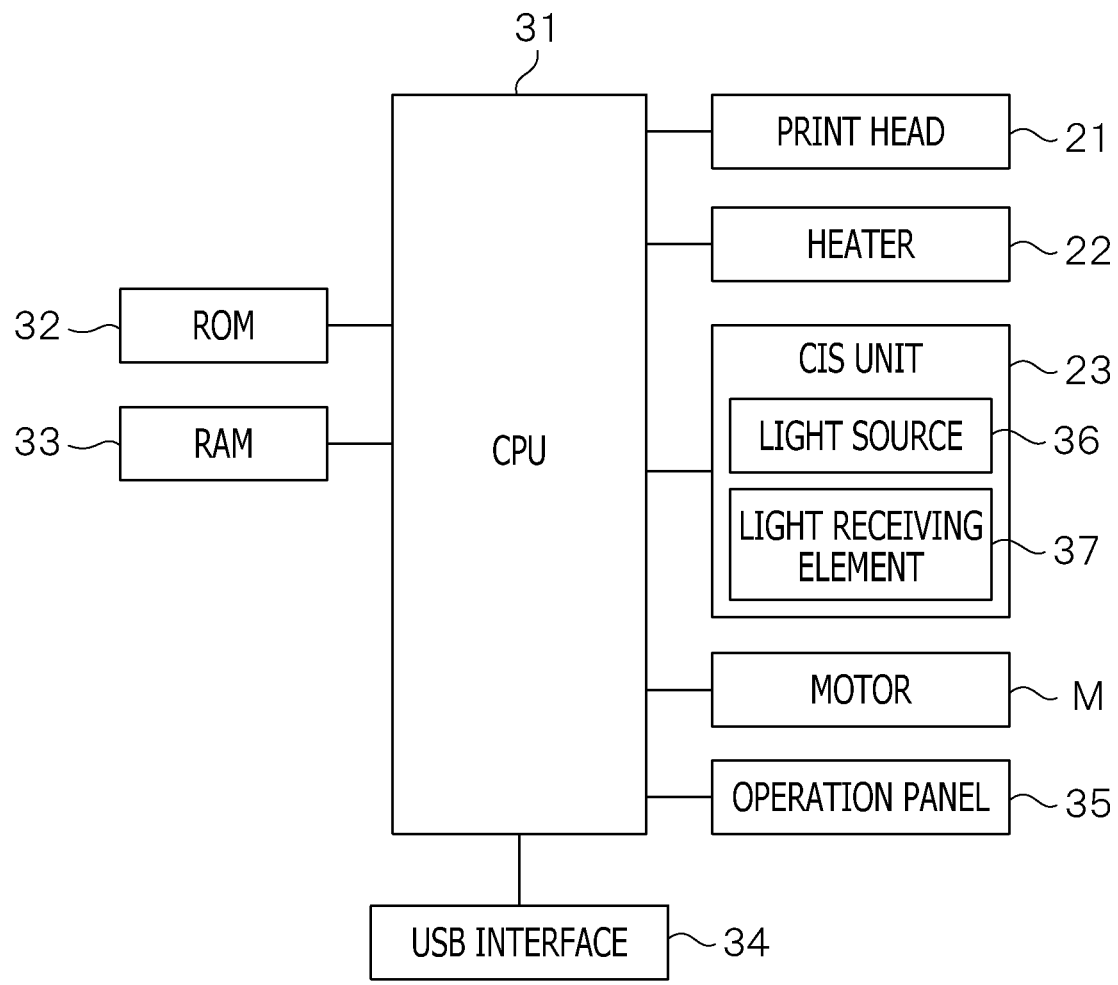
FIG. 2 is a block diagram illustrating essential parts of an electrical configuration of the label printer.

As shown in FIG. 2, the label printer 1 includes a Central Processing Unit (CPU) 31, a Read Only Memory (ROM) 32, and a Random Access Memory (RAM) 33.

The CPU 31 controls operations of the print head 21, the heater 22, the CIS unit 23, and the motor M by executing programs for various processes. The CIS unit 23 includes an analog front end (AFE) that amplifies an analog signal output from each light receiving element 37 of the CIS unit 23 and converts the amplified analog signal into a digital signal. Image data that is the digital signal after the conversion by the AFE is input to the CPU 31.

The ROM 32 is a rewritable nonvolatile memory such as a flash memory. The ROM 32 stores programs to be executed by the CPU 31, various data, and the like.

The RAM 33 is a volatile memory such as a Dynamic Random Access Memory (DRAM), and is used as a work area when the CPU 31 executes programs.

An encoder is provided in association with the motor M, and an encoder signal, which is a pulse signal synchronized with the rotation of the motor M, is input to the CPU 31 from the encoder. The RAM 33 is used by the CPU 31 as a step counter. The CPU 31 can grasp a position of the continuous sheet P by counting the number of pulses of the encoder signal input from the encoder when the motor M is driven in the forward direction and the number of pulses of the encoder signal input from the encoder when the motor M is driven in the reverse direction with the step counter.

The label printer 1 includes a USB interface 34. The USB interface 34 is an interface for data communication with a USB device such as a USB memory, and includes a USB connector to which a USB cable or the like is to be connected and a USB controller that controls the USB connection with the USB device.

The label printer 1 includes an operation panel 35. The operation panel 35 includes an operation interface that is operated for various settings, and a display for displaying information. The operation interface and the display may be provided separately or may be in the form of a touch panel in which an operation unit such as a transparent film switch of a pressure sensitive type or a capacitance type is superimposed on a display unit such as a liquid crystal display.

Inspection Process

In the label printer 1, a USB memory storing raster image data obtained by rasterizing print data is connected to the USB interface 34 (USB connector). When printing of an image related to the raster image data stored in the USB memory is instructed by pressing a print start button provided on the operation panel 35, printing processing is started, and the image is printed on the label L on the continuous sheet P by the print head 21.

In a case where an image to be printed on the label L includes a bar code, when printing on the label L is started, by a printing process program, a request to inspect whether the bar code included in the printed image satisfies a prescribed condition is output (quality inspection). In case of a bar code (one dimensional code), the prescribed condition is that the bar code satisfies, for example, the standard defined by JIS X 0520 (corresponding international standard: ISO/IEC 15416).

Figure 3:
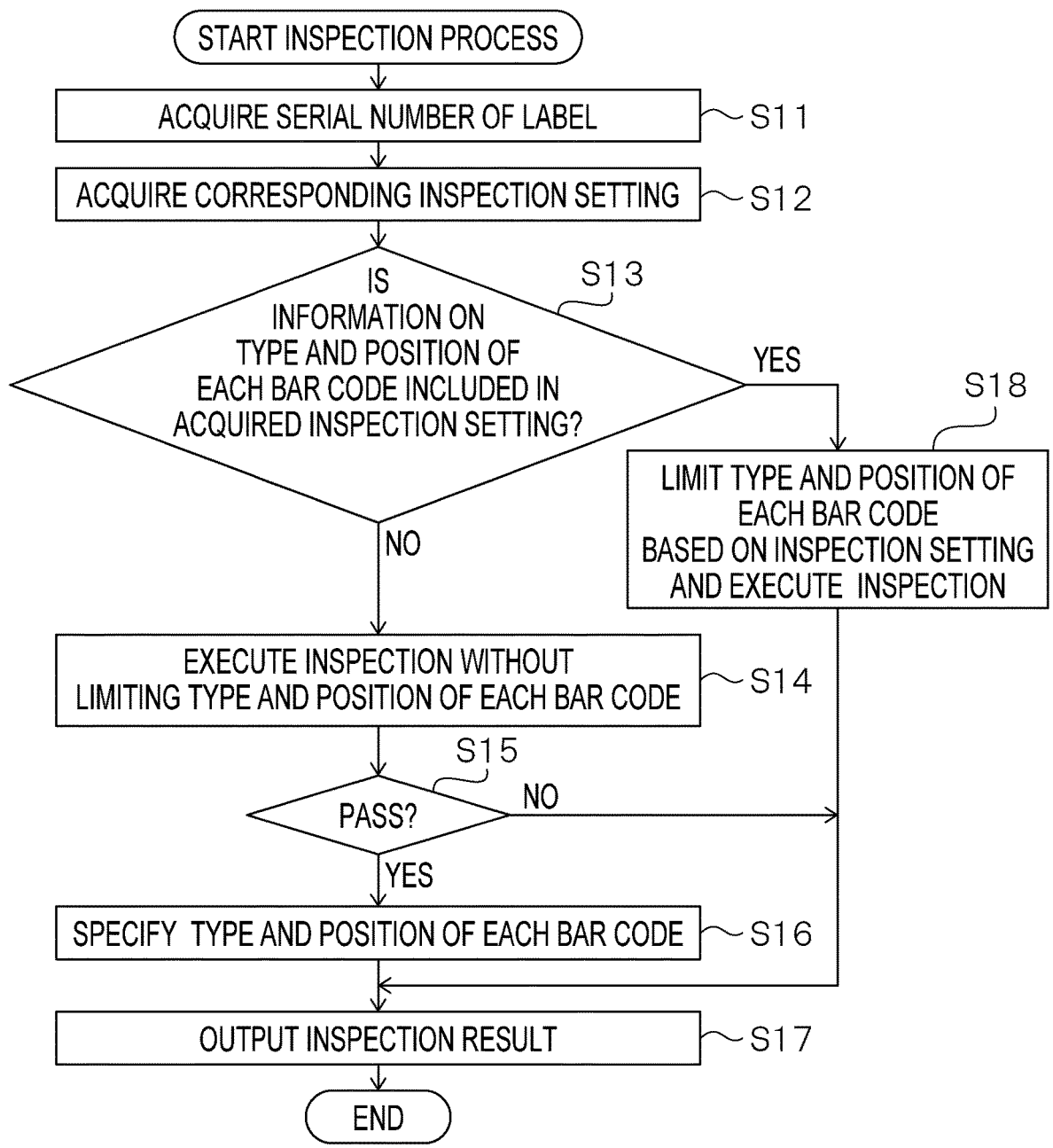
FIG. 3 is a flowchart illustrating a flow of an inspection process.

When the inspection request is output, the CPU 31 starts an inspection process shown in FIG. 3.

In the inspection process, the CPU 31 acquires a serial number of the label L on which the image to be inspected is printed (S11). In each of the programs for the printing process and the inspection process, serial numbers "1, 2, 3, . . . " are assigned to respective labels L on each of which the image is printed in order from the first label L.

Figure 4:
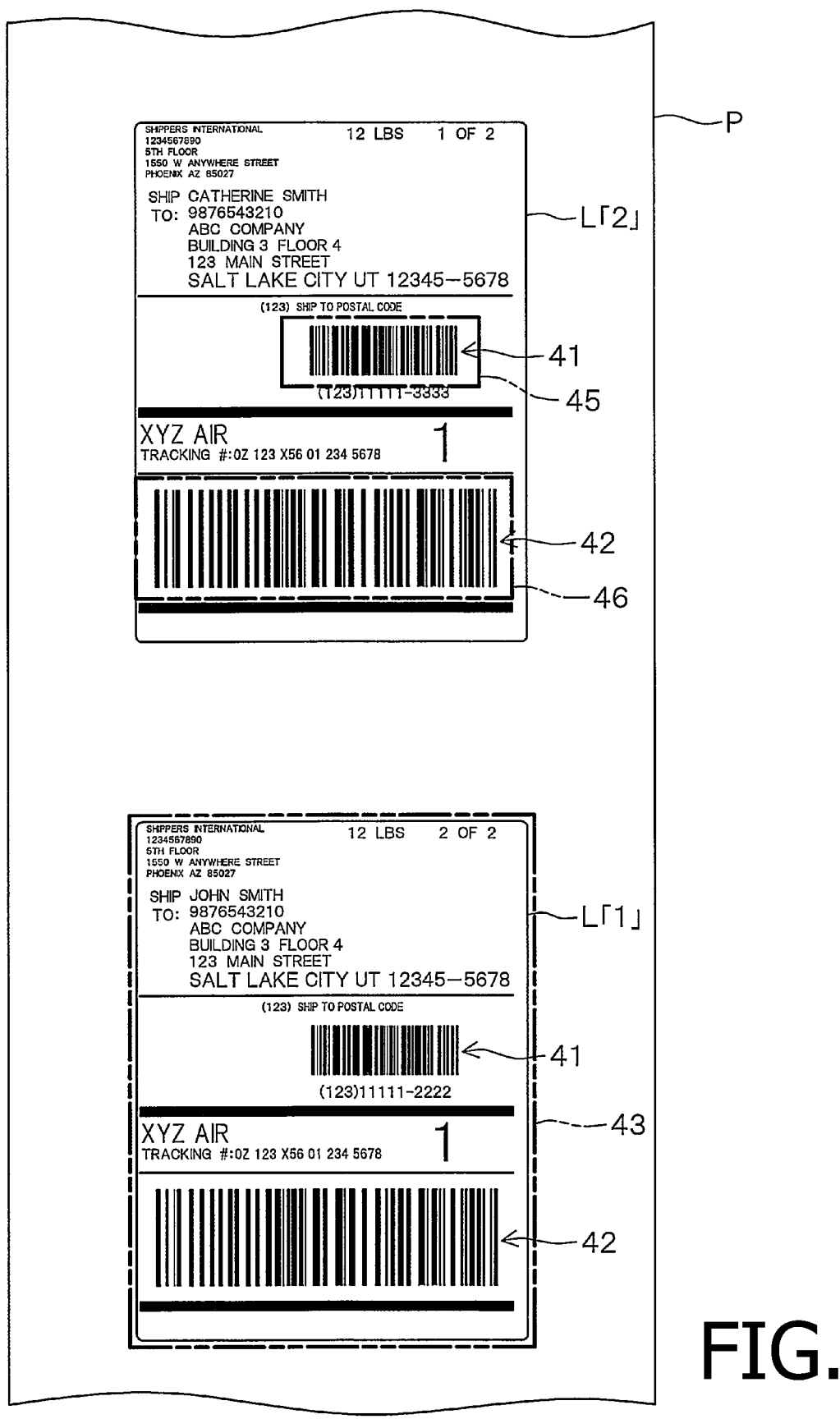
FIG. 4 is a diagram illustrating examples of images printed on first and second labels.

After acquiring the serial number of the label L, the CPU 31 acquires an inspection setting corresponding to the label L of the acquired serial number by reading the inspection setting from the RAM 33 (S12). For example, as shown in FIG. 4, when a plurality of images, each of which positions of bar codes 41 and 42 in the label L (printing positions) are the same as the other images, are printed on a plurality of labels L, respectively, the inspection setting corresponding to the label L with the serial number "1," that is, the inspection setting corresponding to the first label L, includes the number of bar codes (in the present embodiment, the number of bar codes 41 and 42 which is two) included in the image printed on the label L, but does not include information on the type and position of each of the bar codes 41 and 42. The number of bar codes included in the image to be printed on the label L is input, for example, by a user by operating the operation panel 35 before starting the printing process.

Then, the CPU 31 determines whether the information on the type and position of each of the bar codes 41 and 42 is included in the acquired inspection setting (S13).

Since the inspection setting corresponding to the label L with the serial number "1" does not include information on the type and position of each of the bar codes 41 and 42 (S13: NO), the CPU 31 executes inspection of qualities of the bar codes 41 and 42 included in the image printed on the label L with the serial number "1" based on the inspection setting without limiting the type and position of each of the bar codes 41 and 42 (S14). In this quality inspection, at the timing when the label L with the serial number "1" approaches the reading position of the CIS unit 23, the CPU 31 controls the CIS unit 23 to cause the CIS unit 23 to read the entire image printed on the label L. Then, the CPU 31 inspects whether each of the bar codes 41 and 42 included in the image satisfies the prescribed condition based on the read data (read image) read by the CIS unit 23 with the entire image read by the CIS unit 23 as a processing range 43. In FIG. 4, the label L with the serial number "1" is specified by assigning the reference numeral L1, the label L with the serial number "2" is specified by assigning the reference numeral L2, and processing ranges are indicated by two dot chain lines.

The CPU 31 determines whether the inspection result of each of the bar codes 41 and 42 is "pass" (S15).

When the bar codes 41 and 42 both satisfy the prescribed condition, the CPU 31 determines that the inspection result of each of the bar codes 41 and 42 is "pass" (S15: YES). In this case, the CPU 31 specifies the type and position of each of the bar codes 41 and 42 from the read data of the image printed on the label L with the serial number "1", and add information on the type and position of each of the bar codes 41 and 42 to the inspection settings corresponding to the labels L with the serial number "2" and thereafter (S16). Therefore, the inspection settings corresponding to the labels L with the serial number "2" and thereafter, that is, the inspection settings corresponding to the second and subsequent labels L, include the information on the type and position of each of the bar codes 41 and 42 in addition to the number of bar codes included in the image printed on the label L. Then, the CPU 31 outputs the inspection result (S17), and ends the inspection process. For example, the output inspection result is displayed on the operation panel 35.

On the other hand, if one of the bar codes 41 and 42 does not satisfy the prescribed condition, the CPU 31 determines that the inspection result of each of the bar codes 41 and 42 is not "pass," that is, "fail" (S15: NO). In this case, the CPU 31 outputs the inspection result (S17) without specifying the type and position of each of the bar codes 41 and 42, and ends the inspection process.

When the type and position of each of the bar codes 41 and 42 are specified from the read data of the image printed on the label L with the serial number "1," the inspection settings corresponding to the labels L with the serial number "2" and thereafter include information on the type and position of each of the bar codes 41 and 42. In this case (S13: YES), the CPU 31 limits the type and position of each of the bar codes 41 and 42 based on the inspection settings and, as shown in FIG. 4, extracts processing ranges 45 and 46 respectively including the bar codes 41 and 42 from the read data read by the CIS unit 23. Each of the processing ranges 45 and 46 is extracted while including a quiet zone of each of the bar codes 41 and 42 in consideration of meandering and/or wobbling of the continuous sheet P during conveyance. Then, the CPU 31 inspects whether each of the bar codes 41 and 42 satisfies the prescribed condition based on the read data within the extracted processing ranges 45 and 46 (S18). After completion of the inspection of each of the bar codes 41 and 42, the CPU 31 outputs the inspection result (S17), and ends the inspection process.

Failure Process

Figure 5:
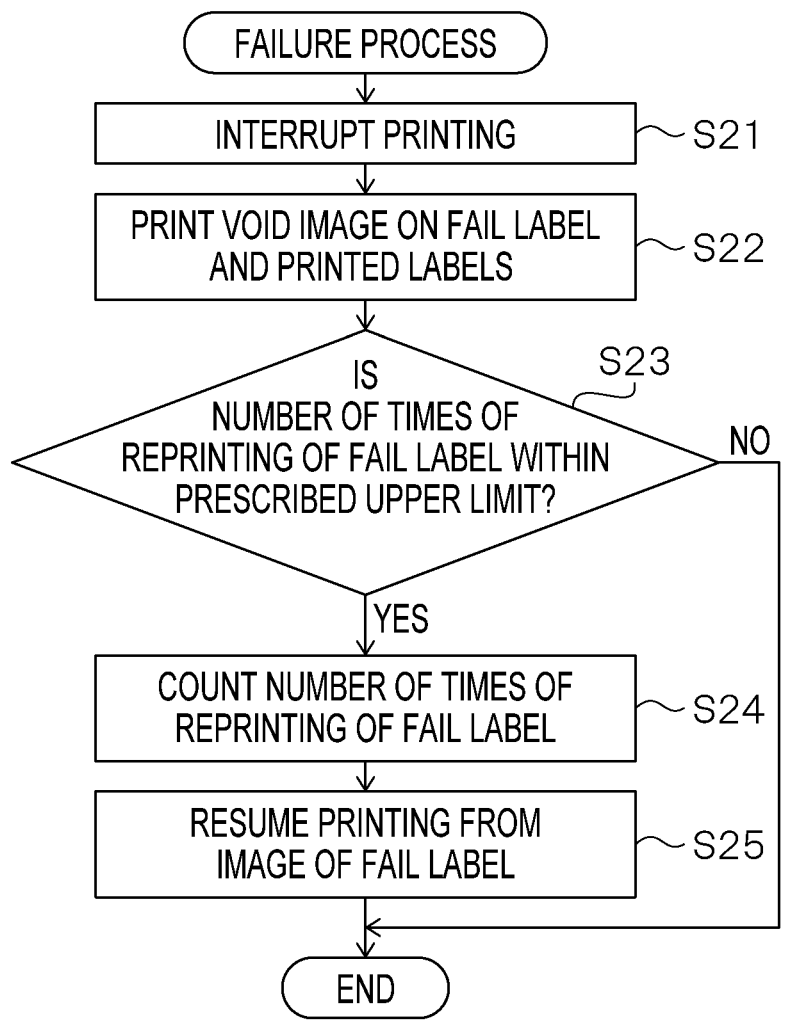
FIG. 5 is a flowchart illustrating a flow of a failure process.

When the inspection result output in the inspection process is "fail", the CPU 31 interrupts the printing process and performs the failure process shown in FIG. 5.

In the failure process, the CPU 31 interrupts the printing process in response to the output of the inspection result "fail" by the inspection process to interrupt the printing of the image on the label L by the print head 21 (S21). At this point, the image has already been printed on each of the labels L including the label L on which the image including the bar codes 41 and 42 having the inspection result "fail" is printed (hereinafter referred to as "fail label L") and the labels located upstream of the fail label L and downstream of the printing position by the print head 21 in the feeding direction (hereinafter referred to as "printed labels L").

After stopping printing, the CPU 31 drives the motor M in the reverse direction to convey the continuous sheet P in the pull-back direction to pull the fail label L back to the printing position by the print head 21. Then, the CPU 31 drives the motor M in the forward direction to convey the continuous sheet P in the feed direction and causes the print head 21 to print a void image over each of the images on the fail label L and the printed labels L (S22). The void image is an image for allowing the user to recognize that the fail label L and the printed labels L are labels L to be discarded, and may be a pattern, such as a black and white grid, that makes the fail label L and the printed labels L unrecognizable.

After starting printing the void image, the CPU 31 determines whether the number of times of reprinting of the fail label L is within a prescribed upper limit (S23). Each of the images of the fail label L and the printed labels L is reprinted within by the number of times not exceeding the upper limit.

When it is determined that the number of times of reprinting of the fail label L is within the prescribed upper limit (S23: YES), the CPU 31 increments a value of a counter for counting the number of times of reprinting of the fail label L by one (S24).

The label L adjacent to and upstream of the most upstream printed label L in the feeding direction is a blank label L on which an image has not yet been printed. After printing the void image on the most upstream printed label L in the feeding direction, the CPU 31 controls the print head 21 to reprint the images of the fail label L and the printed labels L, in order from the image of the fail label L, on the blank labels L upstream of the most upstream printed label L in the feeding direction (S25).

When the reprinting of the respective images of the fail label L and the printed labels L is completed, the CPU 31 ends the failure process and resumes the printing process to restart printing of images for the labels L of the serial numbers subsequent to the serial number of the upstream one of the printed labels L.

When the reprinting of the fail label L is repeated and the number of times of reprinting of the fail label L exceeds the prescribed upper limit (S23: NO), the CPU 31 ends the rejection process while keeping the printing process interrupted. In this case, for example, an error message indicating that the printing process is interrupted because the image of the fail label L cannot be reprinted properly is displayed on the operation panel 35.

Advantageous Effects

As described above, the continuous sheet P having a plurality of labels L is conveyed in the feeding direction which is the direction in which the labels L are arranged, and the images printed on the labels L on the conveyed continuous sheet P are read by the CIS unit 23.

when a plurality of images, each of which the positions of the bar codes 41 and 42 in the label L are the same as the other images, are printed on a plurality of labels L, respectively, the image printed on the label L with serial number "1" is read by the CIS unit 23. Then, from the read data read by the CIS unit 23, it is inspected whether each of the bar codes 41 and 42 satisfies the prescribed condition, and information specifying the type and position of each of the bar codes 41 and 42 is acquired. Then, when the image printed on the label L upstream of the label L with serial number "1" in the feed direction is read by the CIS unit 23, the processing ranges respectively including the bar codes 41 and 42 are extracted from the read image read by the CIS unit 23 based on the previously acquired information, and it is inspected whether the bar codes 41 and 42 included in the extracted processing ranges satisfy the prescribed condition. As a result, only the processing ranges which are portions of the entire read image need to be subjected to image processing for quality inspection as to whether the bar codes 41 and 42 satisfy the prescribed condition. Therefore, the time required for quality inspection of the bar codes 41 and 42 can be shortened.

The processing ranges respectively including the bar codes 41 and 42 can be extracted if at least the positions of the bar codes 41 and 42 are specified and information of the positions is included in the inspection setting. However, in the above-described embodiment, the type and position of each of the bar codes 41 and 42 are specified from the read data of the image printed on the label L with the serial number "1." If information of the types of the bar codes 41 and 42 is included in the inspection setting, a necessary process can be selected from a plurality of processes such as a data matrix process, and the time required for the quality inspection can be further shortened. If the information of the types of the bar codes 41 and 42 is not included in the inspection setting, optimum inspections corresponding to the types of the bar codes 41 and 42 may not be executed and thus wrong inspections may occur. However, if the information of the types of the bar codes 41 and 42 is included in the inspection setting, only inspections suitable for the types of the bar codes 41 and 42 can be performed, and thus wrong inspections are less likely to occur.

Modification

In the above-described embodiment, for the labels L with the serial number "2" and thereafter, the entire image printed on the label L is read by the CIS unit 23 and the processing ranges respectively including the bar codes 41 and 42 are extracted from the entire read data of the read image.

Figure 6:
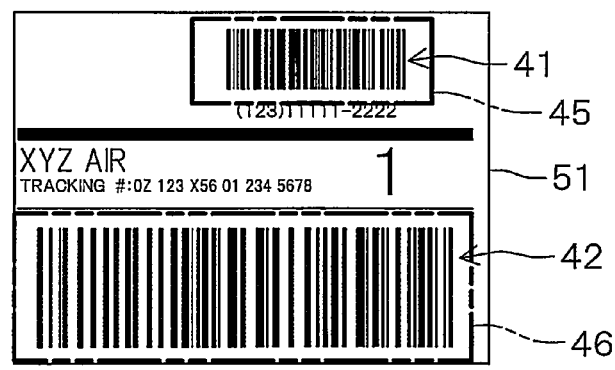
FIG. 6 is a diagram illustrating examples of settings of an image reading area by a CIS unit.

Alternatively, for the labels L with the serial number "2" and thereafter, as shown in FIG. 6, a reading range 51 including both the bar codes 41 and 42 may be set based on the information of the positions of the bar codes 41 and 42 included in the inspection setting, and only the reading range 51 may be read by the CIS unit 23. In this way, the data volume of the read data acquired for inspecting the bar codes 41 and 42 can be reduced. As a result, free space in the RAM 33 can be increased, and processing load on the CPU 31 for the inspection process can be reduced.

Figure 7A:
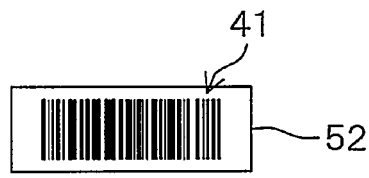
FIG. 7A is a diagram illustrating another example of the setting of the image reading area by the CIS unit.
Figure 7B:
FIG. 7B is a diagram illustrating another example of the setting of the image reading area by the CIS unit.

As for the labels L with the serial number "2" and thereafter, as shown in FIGS. 7A and 7B, reading ranges 52 and 53 respectively including the bar codes 41 and 42 may be set based on the information of the positions of the bar codes 41 and 42 included in the inspection setting, and only the reading ranges 52 and 53 may be read by the CIS unit 23. In this way, it is possible to further reduce the data volume of the read data acquired for inspecting the bar codes 41 and 42. As a result, the free space in the RAM 33 can be further increased, and the processing load on the CPU 31 for the inspection process can be further reduced.

Printing and Inspection Process

In the above-described embodiment, by the printing process program, the request to inspect whether the bar codes included in the printed image satisfy the prescribed condition is output, the inspection process is started in response to the output of the request, and the inspection process is executed in parallel with the printing process. In this configuration, since, in the quality inspection of the bar codes included in the image printed on the label L with the serial number "1," the entire read data read by the CIS unit 23 (the entire image printed on the label L) is defined as the processing range 43, the quality inspection of the bar codes takes time. Therefore, the inspection of the bar codes and the printing of the image on the label L cannot be synchronized but the quality inspection of the bar codes delays with respect to the printing of the image on the label L. If the quality inspection of the bar codes delays, pieces of the read data (read images) waiting for the quality inspection are accumulated in the RAM 33, and there is a possibility that the free space in the RAM 33 becomes insufficient. Furthermore, there is a problem that, when the quality of the bar code is determined to be defective, the number of labels L on which the image has already been printed is large at the time of the determination, and the large number of labels L cannot be used and are wasted.

Figure 8A:
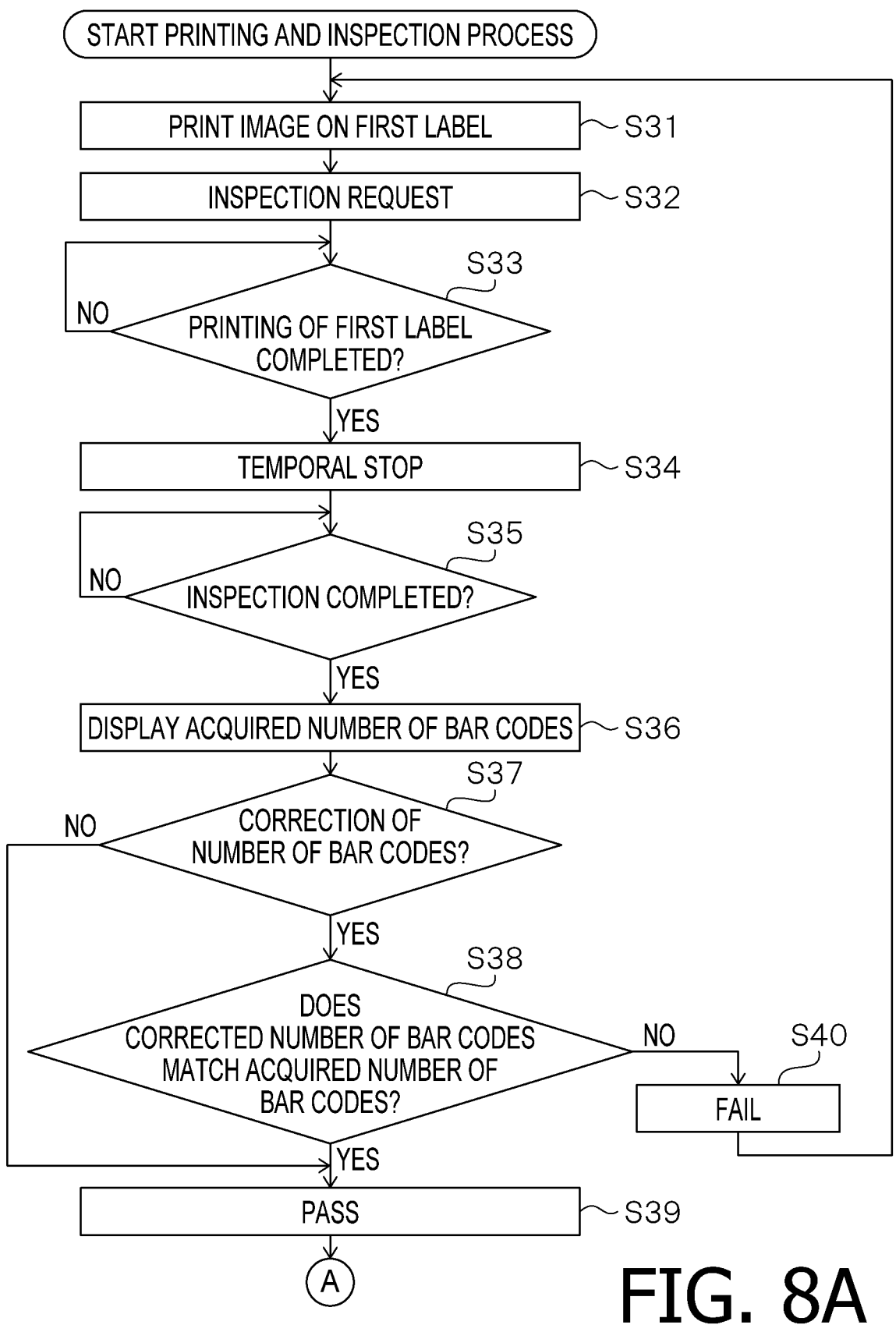
FIGS. 8A and 8B show a flowchart illustrating a flow of a printing and inspection process.
Figure 8B:
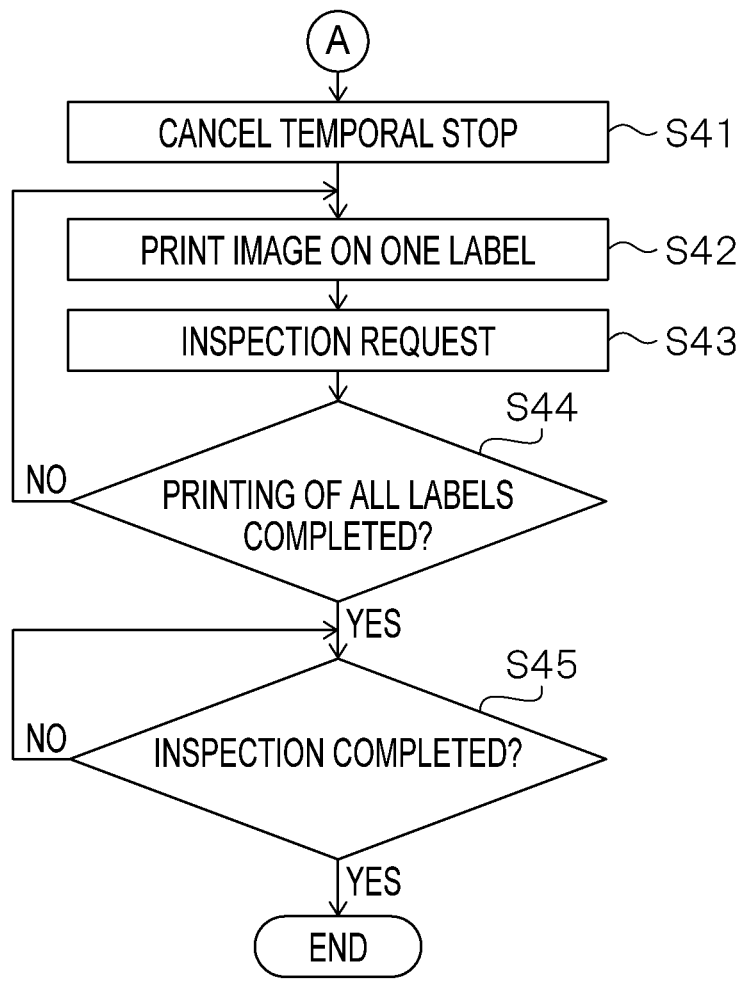

Therefore, in place of the configuration in which the above-described printing process and inspection process are executed, a configuration configured to execute a printing and inspection process shown in FIGS. 8A and 8B may be adopted.

In the printing and inspection process, when printing of an image related to the raster image data stored in the USB memory is instructed, the CPU 31 controls the print head 21 and the motor M to print the image on the label L with the serial number "1," that is, on the first label L on the continuous sheet P (S31).

When printing of the image on the label L with the serial number "1" is started, the CPU 31 generates a request to inspect whether one or more bar codes included in the image printed on the label L with the serial number "1" satisfies the prescribed condition (S32). In response to the inspection request, an inspection request flag set in the RAM 33 is turned on.

When it is determined that the printing of the image on the label L with the serial number "1" is completed (S33: YES), the CPU 31 temporarily stops the printing by the print head 21 (S34).

Then, the CPU 31 determines whether the quality inspection of the one or more bar codes included in the image printed on the label L with the serial number "1" (hereinafter referred to as "one or more bar codes on the label L with the serial number "1") is completed (S35). The printing and inspection process does not proceed to the next step until the quality inspection of the one or more bar codes on the label L with the serial number "1" is completed.

When it is determined that the quality inspection of the one or more bar codes on the label L with the serial number "1" is completed (S35: YES), the CPU 31 turns off the inspection request flag. Then, the CPU 31 acquires the number of bar codes included in the image from the read data of the image printed on the label L with the serial number "1." Then, the CPU 31 causes the operation panel 35 to display the acquired number of bar codes. The CPU 31 further causes the operation panel 35 to display a message asking the user whether to continue the printing and inspection process without correcting the number of bar codes input by the user before the start of the printing (S36).

When the user operates the operation panel 35 in response to the displayed message to select "NO" indicating not to continue the printing and inspection process, a screen for inputting a corrected number of bar codes is displayed on the operation panel 35. When the corrected number of bar codes is inputted by operating the operation panel 35 (S37: YES), the CPU 31 determines whether the corrected number of bar codes matches the number of bar codes acquired from the read data of the image printed on the label L of the serial number "1" (S38).

When it is determined that the corrected number of bar codes matches the number of bar codes acquired from the read data of the image printed on the label L with the serial number "1" (S38: YES), the CPU 31 determines that the inspection result of the one or more bar codes on the label L with the serial number "1" is "pass" (S39).

When the user operates the operation panel 35 in response to the display of the message asking whether to continue the printing and inspection process to select "YES" indicating to continue the printing and inspection process, that is, when the user does not correct the number of bar codes inputted before the start of the printing (S37: NO), the CPU 31 determines that the inspection result of the one or more bar codes on the label L with the serial number "1" is "pass" (S39).

When it is determined that the inspection result of the one or more bar codes on the label L with the serial number "1" is "pass," the CPU 31 specifies the type and position of each bar code on the label L with the serial number "1" based on the read data of the image printed on the label L with the serial number "1," and adds information on the type and position of each bar code in the inspection settings corresponding to the labels L with the serial number "2" and thereafter.

On the other hand, when it is determined that the corrected number of bar codes does not match the number of bar codes acquired from the read data of the image printed on the label L with the serial number "1" (S38: NO), the CPU 31 determines that the inspection result of the one or more bar codes on the label L with the serial number "1" is "fail" (S40). In this case, the CPU 31 causes the print head 21 to print an image on the label L with the serial number "2," that is, on the second label L on the continuous sheet P (S31). Thereafter, the CPU 31 executes the processes from step S32 described above.

After specifying the type and position of each of the one or more bar codes from the read data of the image printed on the label L and adding information on the type and position of each bar code in the inspection settings corresponding to the labels L on which the image is to be printed thereafter, the CPU 31 cancels the temporal stop of the printing by the print head 21 (S41) and resumes the printing of the image on the label L (S42).

Each time printing of the image on one label L with a subsequent serial number is started, the CPU 31 generates a request to inspect whether one or more bar codes included in the image printed on the label L satisfies the prescribed condition (S43). In response to the inspection request, the inspection request flag set in the RAM 33 is turned on. While the inspection request flag is on, the CPU 31 extracts one or more processing ranges respectively including the one or more bar codes from the read data read by the CIS unit 23 sequentially from each of the labels L based on the inspection setting, and inspects whether the one or more bar codes satisfy the prescribed condition based on the read data of the extracted processing range.

Then, the CPU 31 determines whether printing of images on all of the labels L to be printed is completed (S44). Printing of images on all of the labels L to be printed is continued until it is determined that printing of images on all of the labels L to be printed is completed (S44: NO). When it is determined that printing is completed (S44: YES), the CPU 31 determines whether or not the quality inspection of bar codes included in images printed on all of the printed labels L has been completed (S45). The CPU 31 waits until the quality inspection of bar codes included in images printed on all of the printed labels L has been completed. When it is determined that quality inspection is completed (S45: YES), the CPU 31 ends the printing and inspection process.

In this configuration in which the printing and inspection process is performed, it is possible to synchronize the inspection of the one or more bar codes with the printing of the image on the label L. As a result, it is possible to prevent the read data (read image) waiting for the quality inspection from being accumulated in the RAM 33 to eliminate the possibility that the free space of the RAM 33 becomes insufficient. Furthermore, in case the quality of the one or more bar codes is determined to be defective, since it is possible to reduce the number of labels L on each of which the image has already been printed at the time the determination is made, the number of labels L that cannot be used and are wasted can be reduced.

Other Modifications

Figure 9:
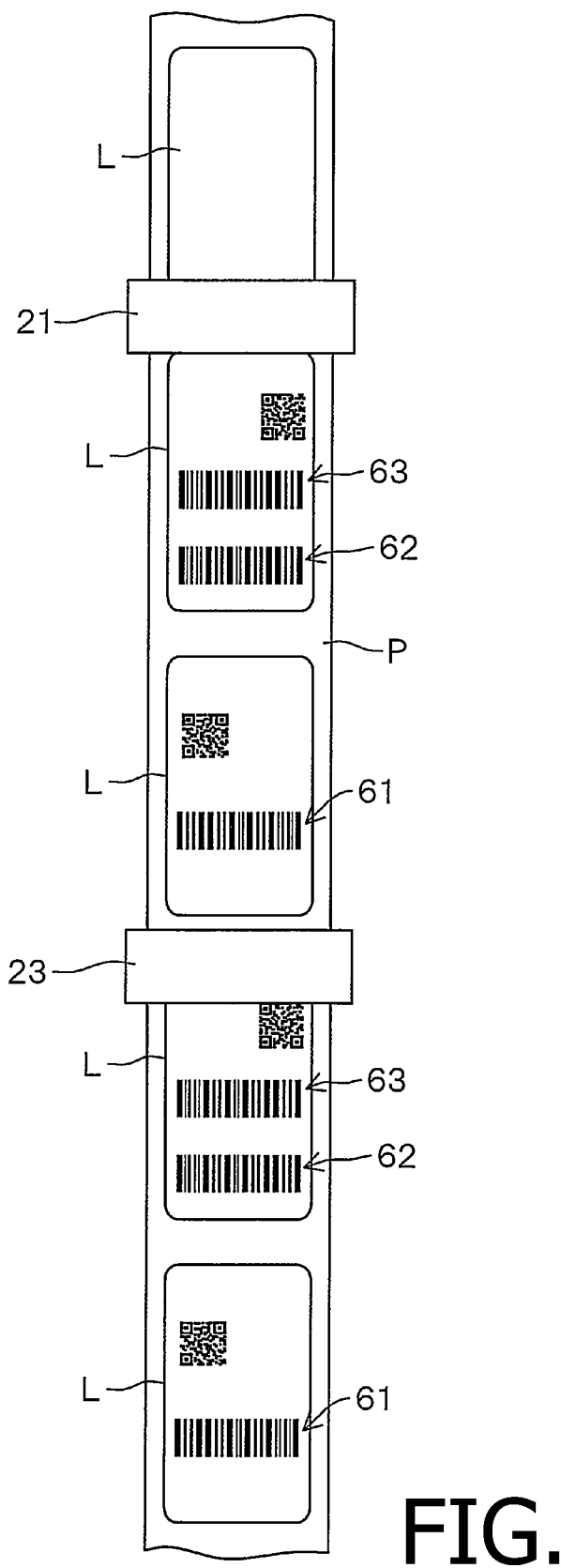
FIG. 9 is a diagram illustrating an example in which an image set consisting of two images respectively including bar codes and respectively printed on two consecutive labels, each of the two images in which positions of the bar codes are different from the other, are repeatedly arranged in the feeding direction.

In the above-described embodiment and modification, as shown in FIG. 4, a plurality of images, each of which positions of the bar codes 41 and 42 in the label L (printing positions) are the same as the other images, are printed on a plurality of labels L. However, as shown in FIG. 9, when an image set consisting of two images respectively including bar codes and respectively printed on two consecutive labels L, each of the two images in which positions of the bar codes are different from the other, is repeatedly arranged in the feed direction, for example, even if the types and positions of the one or more bar codes are specified from the read data of the image printed on the label L with the serial number "1," it is not possible to extract one or more processing ranges including the one or more bar codes from the read data of the image printed on the label L with the serial number "2" based on the information of the types and positions of the one or more bar codes specified from the read data of the image printed on the label L with the serial number "1."

Therefore, in such a case, the CIS unit 23 reads individual images of the image set printed on the label L with the serial number "1" and the image printed on the label L with the serial number "2." Then, from the individual read data read by the CIS unit 23, it is inspected whether or not each of bar codes 61, 62 and 63 satisfies the prescribed condition, and information specifying the type and position of each of the bar codes 61, 62 and 63 is acquired. Then, when the CIS unit 23 reads the image set printed on the labels L upstream of the label L with the serial number "2" in the feeding direction, a processing range including the bar code 61 is extracted for the labels L with odd serial numbers based on the information acquired from the read data of the label L with the serial number "1," and it is inspected whether the bar code 61 included in the extracted processing range satisfies the prescribed condition. Similarly, for the labels L with even serial numbers, processing ranges respectively including the bar codes 62 and 63 are extracted based on the information acquired from the read data of the label L with the serial number "2," and it is inspected whether the bar codes 62 and 63 included in the extracted processing ranges satisfy the prescribed condition.

When the image set includes three or more images, the same process may be executed.

Further Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the label printer 1, the USB memory that stores raster image data obtained by rasterizing print data is connected to the USB interface 34. Alternatively, the USB memory that stores print data may be connected to the USB interface 34, and the print data may be rasterized into raster image data in the label printer 1. In this case, information on the types and positions of the one or more bar codes included in the image to be printed on the label L may be acquired from the print data. The print data is data in which information such as positions of characters, the types of characters, and positions of graphics in the image to be printed is described in the page description language.

In the above-described embodiment, the quality inspection of the one or more bar codes included in the image printed on the label L is executed. However, the code targeted by the present invention is not limited to the bar code but also includes a two dimensional code. That is, when the image printed on the label L includes one or more two dimensional codes, quality inspection of the one or more two dimensional codes may be executed. The prescribed condition for the quality inspection of the two dimensional code is that the standard defined in JIS X 0526 (corresponding international standard: ISO/IEC 15415) is satisfied.

The prescribed condition may be that information in a code (bar code or two dimensional code) can be correctly read by a scanner set by the manufacturer or the user of the label printer 1.

In the printing and inspection process shown in FIG. 8A, the number of bar codes is acquired from the read data of the image printed on the label L with the serial number "1," the acquired number of bar codes is displayed on the operation panel 35, and after confirmation by the user, it is determined whether the number of bar codes input by the user and the number of bar codes acquired from the read data coincide with each other. Alternatively, the CPU 31 may internally determine whether the number of bar codes input by the user and the number of bar codes acquired from the read data coincide with each other without displaying the acquired number of bar codes on the operation panel 35.

In the above-described embodiment, the types and positions of the one or more bar codes are specified from the read data of the image printed on the label L with the serial number "1," and the information on the types and positions of the one or more bar codes is added in the inspection settings corresponding to the labels L with the serial number "2" and thereafter. However, in addition to the types and positions of the one or more bar codes, information such as directions of the one or more bar codes and data before being encoded in the one or more bar codes may be specified from the read data, and the information may be added in the inspection settings corresponding to the labels L with the serial number "2" and thereafter.

In addition, various design changes can be made to the above-described configurations within the scope of the matters described in the claims.

The label printer 1 is an example of a printing apparatus according to aspects of the present disclosure. The continuous sheet P is an example of a medium according to aspects of the present disclosure. The labels L are examples of printing areas according to aspects of the present disclosure. The conveying rollers 16 and 17 and the roll holder 13 are examples of a conveyer according to aspects of the present disclosure. The feeding direction is an example of a conveying direction according to aspects of the present disclosure. The print head 21 is an example of a print engine according to aspects of the present disclosure. The CIS unit 23 is an example of a reader according to aspects of the present disclosure. The CPU 31 is an example of a controller according to aspects of the present disclosure. The USB interface 34 is an example of a receiver according to aspects of the present disclosure. The operation panel 35 is an example of a number input receiver according to aspects of the present disclosure.

What is claimed is:

1. An inspection apparatus comprising:
 a conveyer configured to convey a medium having a plurality of printing areas in a conveying direction so that the plurality of printing areas are conveyed in turn in the conveying direction;
 a reader configured to read images printed in the plurality of printing areas on the medium conveyed by the conveyer; and
 a controller,
 wherein when a plurality of images, each of which a printing position of a code in the printing area is the same as the other images, are respectively printed in the plurality of printing areas, the controller:
 causes the reader to read a prescribed image printed in a prescribed printing area among the plurality of printing areas;
 inspects whether the code satisfies a prescribed condition based on a read image of the prescribed image read by the reader;
 acquires position information for specifying a printing position of the code from the read image of the prescribed image;
 causes the reader to read an upstream image printed in an upstream printing area upstream of the prescribed image in the conveying direction;
 extracts a processing range in which the code is included from a read image of the upstream image read by the reader based on the position information; and
 inspects whether the code included in the processing range satisfies the prescribed condition.

2. The inspection apparatus according to claim 1, further comprising a number input receiver configured to receive an input of the number of the codes included in one printing area.

3. The inspection apparatus according to claim 2,
wherein the controller acquires the number of the codes from the read image of the prescribed image, and when the acquired number does not match the number received through the number input receiver, stops operation of the reader before the image printed in the upstream printing area is read by the reader.

4. The inspection apparatus according to claim 1,
wherein the controller acquires a type of the code from the read image of the prescribed image.

5. The inspection apparatus according to claim 1,
further comprising a display,
wherein the controller:
  acquires a number of codes from a read image of the prescribed image, and
  displays information indicating the acquired number of codes on the display.

6. The inspection apparatus according to claim 1,
wherein the controller sets a reading range by the reader in the upstream printing area based on the position information.

7. The inspection apparatus according to claim 6,
wherein the controller sets the reading range to a range including the code.

8. The inspection apparatus according to claim 1,
wherein the prescribed printing area is a printing area most downstream in the conveying direction among the plurality of printing areas.

9. An inspection apparatus comprising:
a conveyer configured to convey a medium having a plurality of printing areas in a conveying direction so that the plurality of printing areas are conveyed in turn in the conveying direction;
a reader configured to read images printed in the plurality of printing areas on the medium conveyed by the conveyer; and
a controller,
wherein when the plurality of printing areas are to be printed so that a plurality of image sets, each consisting of two or more images respectively including a code and respectively printed in two or more consecutive printing areas in the conveying direction, are repeatedly arranged in the conveyance direction,
the controller:
  causes the reader to read individual images of a prescribed image set among the plurality of image sets;
  inspects whether the codes included in the individual images satisfy a prescribed condition based on the read individual images of the prescribed image set read by the reader;
  acquires position information for specifying printing positions of the codes in the respective printing areas based on the read individual images of the prescribed image set read by the reader;
  causes the reader to read individual images of an upstream image set upstream of the prescribed image set in the conveying direction;
  extracts a processing range in which the code is included from each of the read individual images of the upstream image set based on the position information; and
  inspects whether the code included in each of the extracted processing range satisfies a prescribed condition.

10. A printing apparatus comprising:
an inspection apparatus comprising:
  a conveyer configured to convey a medium having a plurality of printing areas in a conveying direction so that the plurality of printing areas are conveyed in turn in the conveying direction;
  a reader configured to read images printed in the plurality of printing areas on the medium conveyed by the conveyer; and
  a controller,
a receiver configured to receive data of a plurality of images to be printed in the plurality of printing areas, respectively; and
a print engine provided upstream of the reader in the conveying direction and configured to print an image of the data received by the receiver in each of the plurality of printing areas on the medium conveyed by the conveyer,
wherein when the plurality of images, each of which a printing position of a code in the printing area is the same as the other images, are respectively printed in the plurality of printing areas, the controller:
  causes the reader to read a prescribed image printed in a prescribed printing area among the plurality of printing areas;
  inspects whether the code satisfies a prescribed condition based on a read image of the prescribed image read by the reader;
  acquires position information for specifying a printing position of the code from the read image of the prescribed image;
  causes the reader to read an upstream image printed in an upstream printing area upstream of the prescribed image in the conveying direction;
  extracts a processing range in which the code is included from a read image of the upstream image read by the reader based on the position information; and
  inspects whether the code included in the processing range satisfies the prescribed condition.

11. The printing apparatus according to claim 10, wherein:
the receiver receives rasterized image data of the image, and
the controller causes the print engine to print the image of the rasterized image data received by the receiver in each of the plurality of printing areas.

12. The printing apparatus according to claim 10, wherein:
the receiver receives print data of the image, and
the controller rasterizes the print data received by the receiver into rasterized image data of the image and causes the print engine to print the image of the rasterized image data in each of the plurality of printing areas.

13. The printing apparatus according to claim 12,
wherein when the print data is received through the receiver, the controller:
  acquires the position information from the print data:
  extracts the processing range based on the position information; and
  inspects whether the code included in the extracted processing range satisfies the prescribed condition.

14. The printing apparatus according to claim 10,
wherein the controller does not cause the print engine to start printing of the upstream printing area until the inspection on whether the code satisfies the prescribed condition based on the read image of the prescribed image ends.

15. A printing apparatus comprising:
an inspection apparatus comprising:
  a conveyer configured to convey a medium having a plurality of printing areas in a conveying direction so that the plurality of printing areas are conveyed in turn in the conveying direction;
  a reader configured to read images printed in the plurality of printing areas on the medium conveyed by the conveyer; and
  a controller,
a receiver configured to receive data of the two or more images to be printed in the two or more consecutive printing areas, respectively; and
a print engine provided upstream of the reader in the conveying direction and configured to print the two or more images of the data received by the receiver in the two or more consecutive printing areas on the medium conveyed by the conveyer, respectively,
wherein when the plurality of printing areas are to be printed so that a plurality of image sets, each consisting of two or more images respectively including a code and respectively printed in two or more consecutive printing areas in the conveying direction, are repeatedly arranged in the conveyance direction,
the controller:
  causes the reader to read individual images of a prescribed image set among the plurality of image sets;
  inspects whether the codes included in the individual images satisfy a prescribed condition based on the read individual images of the prescribed image set read by the reader;
  acquires position information for specifying printing positions of the codes in the respective printing areas based on the read individual images of the prescribed image set read by the reader;
  causes the reader to read individual images of an upstream image set upstream of the prescribed image set in the conveying direction;
  extracts a processing range in which the code is included from each of the read individual images of the upstream image set based on the position information; and
  inspects whether the code included in each of the extracted processing range satisfies a prescribed condition.

16. The printing apparatus according to claim 15, wherein:
  the receiver receives rasterized image data of the two or more images, and
  the controller causes the print engine to print the two or more images of the rasterized image data received by the receiver in the two or more consecutive printing areas.

17. The printing apparatus according to claim 10, wherein:
  the receiver receives print data of the two or more images, and
  the controller rasterizes the print data received by the receiver into rasterized image data of the two or more images and causes the print engine to print the two or more images of the rasterized image data in the two or more consecutive printing areas.

18. The printing apparatus according to claim 17, wherein when the print data is received through the receiver, the controller:
  acquires the position information from the print data:
  extracts the processing range based on the position information; and
  inspects whether the code included in the extracted processing range satisfies the prescribed condition.

19. The printing apparatus according to claim 15, wherein the controller does not cause the print engine to start printing of the upstream image set until the inspection on whether the code satisfies the prescribed condition based on the read individual images of the prescribed image set ends.

* * * * *